United States Patent
Dhawan

(10) Patent No.: US 9,202,522 B2
(45) Date of Patent: Dec. 1, 2015

(54) METHOD AND APPARATUS FOR SUBTITLE DISPLAY

(71) Applicant: Adobe Systems Incorporated, San Jose, CA (US)

(72) Inventor: Anmol Dhawan, Ghaziabad (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 31 days.

(21) Appl. No.: 13/889,461

(22) Filed: May 8, 2013

(65) Prior Publication Data

US 2014/0334799 A1    Nov. 13, 2014

(51) Int. Cl.
```
G11B 27/10      (2006.01)
H04N 21/488     (2011.01)
H04N 21/6587    (2011.01)
H04N 13/00      (2006.01)
H04N 21/2387    (2011.01)
G11B 27/00      (2006.01)
```

(52) U.S. Cl.
CPC ............ *G11B 27/10* (2013.01); *G11B 27/005* (2013.01); *H04N 13/007* (2013.01); *H04N 21/2387* (2013.01); *H04N 21/4884* (2013.01); *H04N 21/6587* (2013.01)

(58) Field of Classification Search
CPC ............... H04N 21/6587; H04N 21/2387; H04N 9/8205; H04N 21/435; H04N 9/8233; H04N 21/4884; H04N 13/007
USPC ........................................ 386/343–344, 350
See application file for complete search history.

(56) References Cited

U.S. PATENT DOCUMENTS

| | | | | |
|---|---|---|---|---|
| 6,249,640 B1 * | 6/2001 | Takiguchi | ............ | H04N 9/8227 386/200 |
| 6,253,025 B1 * | 6/2001 | Kitamura | ............. | G11B 27/034 348/E11.006 |
| 6,487,642 B1 * | 11/2002 | Duruoz | ............... | G06F 9/45512 711/145 |
| 6,587,635 B1 * | 7/2003 | Subramanian | ......... | H04N 5/783 386/201 |
| 6,801,709 B1 * | 10/2004 | Park | .................... | H04N 5/44508 348/E5.101 |
| 7,840,114 B2 * | 11/2010 | Ogata | .................. | G11B 27/005 386/340 |
| 8,079,054 B1 * | 12/2011 | Dhawan | ................. | G06Q 30/00 705/14.4 |
| 8,306,386 B2 * | 11/2012 | Hashimoto | .......... | H04N 9/8042 386/239 |
| 8,418,193 B2 * | 4/2013 | Saito | ....................... | H04H 60/33 725/12 |
| 2003/0068158 A1 * | 4/2003 | Kudou | ............................ | 386/95 |
| 2003/0113102 A1 * | 6/2003 | Lin | ..................... | H04N 5/44504 386/302 |
| 2005/0123273 A1 * | 6/2005 | Jeon et al. | ......................... | 386/68 |
| 2005/0244135 A1 * | 11/2005 | Yahata et al. | .................... | 386/52 |
| 2009/0073314 A1 * | 3/2009 | Uemukai | .............. | G11B 27/034 348/468 |
| 2014/0240472 A1 * | 8/2014 | Hamasaki | ............ | H04N 13/007 348/51 |

* cited by examiner

*Primary Examiner* — Helen Shibru
(74) *Attorney, Agent, or Firm* — Keller Jolley Preece

(57) ABSTRACT

A computer implemented method and apparatus for subtitle display. The method comprises determining a second display speed in response to a command to change a first display speed of digital content, wherein the digital content comprises a plurality of frames and a plurality of subtitles, and wherein the plurality of subtitles are displayed for a predefined length of time determined by an association with the digital content at the first display speed; identifying at least one subtitle associated with a frame of the digital content at a location nearest in time to the frame; presenting for display frames of the digital content at the second display speed; and presenting for display the at least one subtitle in a new association with the frames of digital content being displayed at the second display speed.

20 Claims, 4 Drawing Sheets

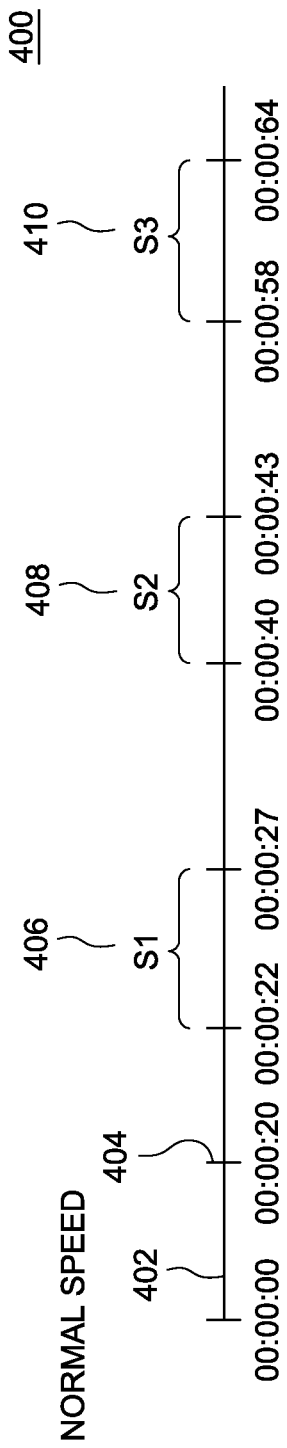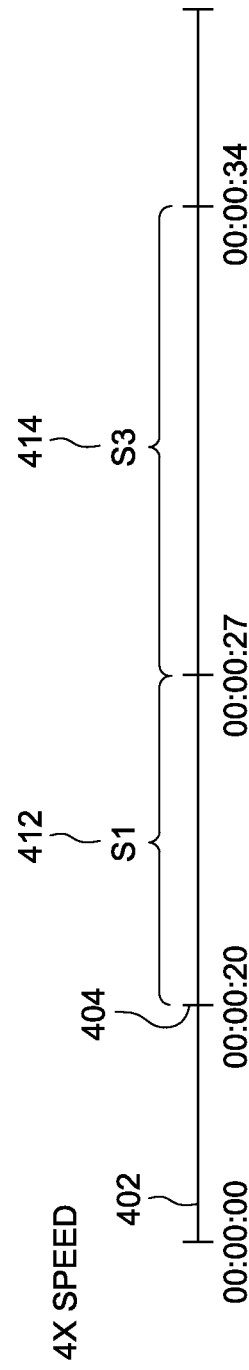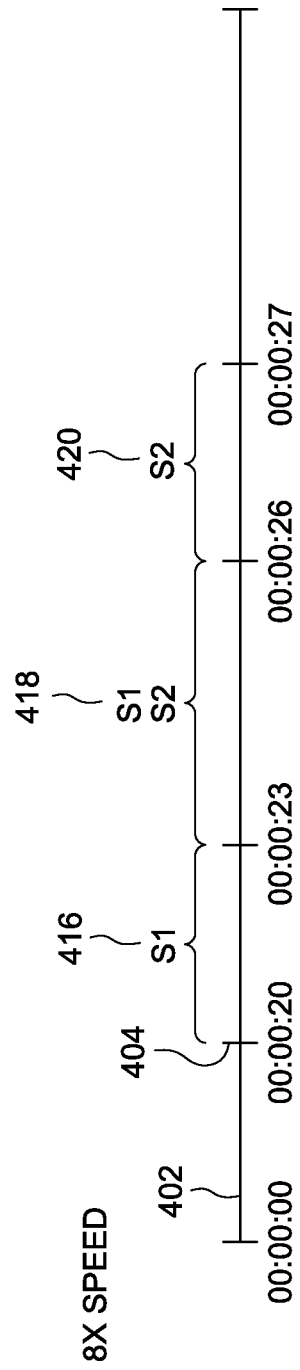

METHOD AND APPARATUS FOR SUBTITLE DISPLAY

BACKGROUND OF THE INVENTION

1. Field of the Invention

Embodiments of the present invention generally relate to video playback and, more particularly, to a method and apparatus for subtitle display.

2. Description of the Related Art

Television programs, films, video games and other digital content are often displayed with subtitles. Subtitles may be in the form of a written translation of dialog in a foreign language or a written rendering of the dialog in the same language to help viewers who are deaf or hard-of-hearing to follow the dialog. While a portion of the digital content is being viewed, the subtitles are displayed at the bottom of a viewing screen. However, displaying subtitles when the digital content is being played at a rate different than normal remains a challenge.

Currently, when the digital content is displayed using a fast-forward mode, or a reverse mode, the changed display speed makes the subtitles virtually unreadable. For example, if digital content is fast-forwarded at a speed of eight times (8×) normal speed, every $8^{th}$ frame of the video content is displayed while 7 consecutive frames are skipped. The subtitles associated with those frames are skipped at the same rate as the image content, and therefore are displayed either very rapidly, or not at all. While using the fast forward or reverse modes, the ability to determine a specific location of a desired portion of display content is limited to visual or temporal cues (e.g., observing, at a high rate of frames per second, video digital content that appears similar to the desired video content). The ability to view the subtitles would be extremely useful to help understand the context of the scenes, especially for content that may have periods of mostly static scenes, such as a long conversation, as in a news or training video.

Therefore, in the event of a change in display speed, there is a need for a method and apparatus for subtitle display.

SUMMARY OF THE INVENTION

A method and apparatus for subtitle display substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 4A-4C depict an illustration of displaying subtitles during a change of speed as performed by the subtitle resynchronization module of FIG. 1, according to one or more embodiments.

Figure 1:
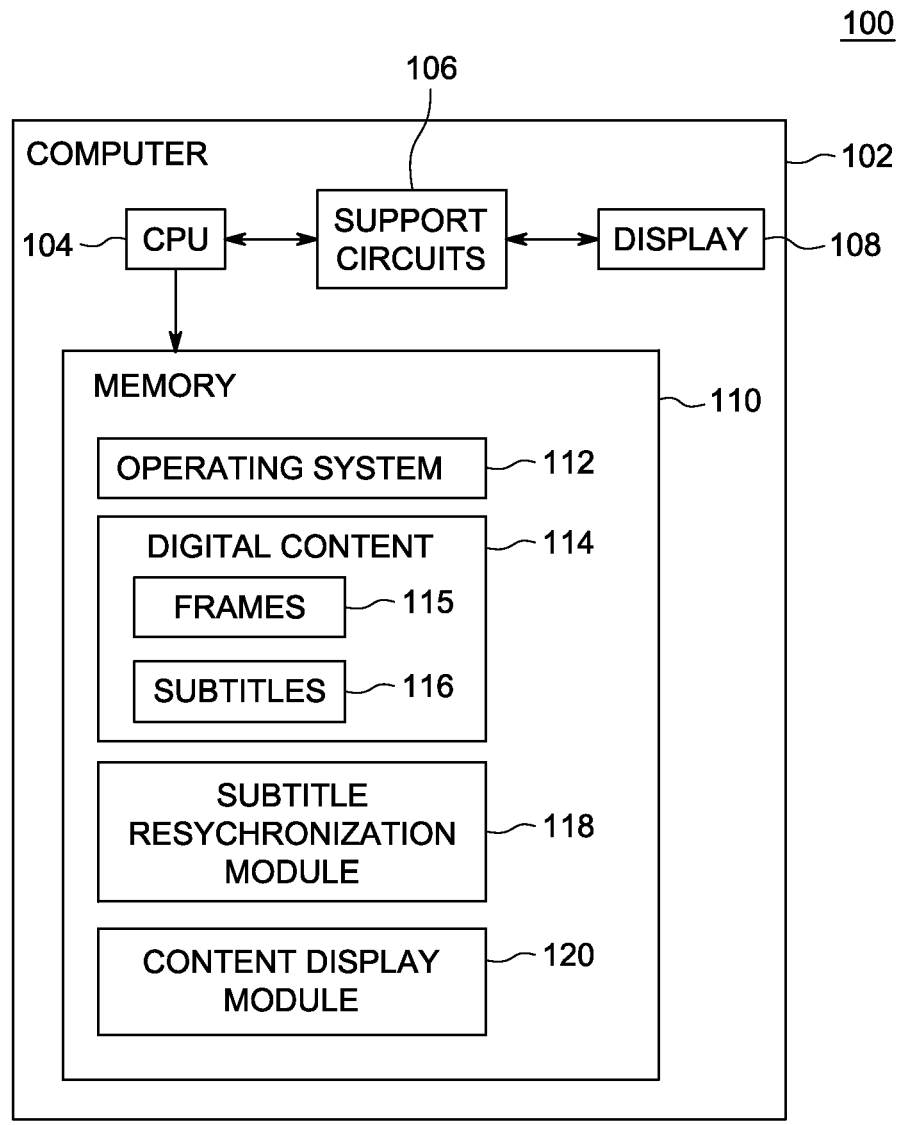
FIG. 1 is a block diagram of a system for subtitle display, according to one or more embodiments.

While the method and apparatus is described herein by way of example for several embodiments and illustrative drawings, those skilled in the art will recognize that the method and apparatus for subtitle display is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for subtitle display defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for subtitle display. During fast-forwarding of digital content, the embodiments select subtitles relevant to the digital content display that represent the digital content that is being fast-forwarded. Although the present disclosure discusses the invention in terms of fast-forwarding, the illustrated embodiments of the invention pertain equally to the reverse (rewind) mode of digital content display.

Digital content is typically displayed at a first or normal display speed. When a second display speed, such as 8× the normal speed, 4× the normal speed, rewind, and the like, frames of image content are skipped. Subtitles associated with those frames are skipped as well. During fast-forwarding of the digital content, the embodiments display fewer subtitles for the duration the subtitle is intended during normal speed display of the digital content. This gives a user time to read the subtitle during fast-forwarding so that the user may better understand the context of the digital content as it is displayed during fast-forwarding.

In some embodiments, one or more subtitles are displayed. In some embodiments, the displayed subtitles are selected based on timing in relation to the digital content being displayed, where if, for example, the fast-forward speed is 8× the normal speed, every $8^{th}$ frame is displayed. If the fast-forward speed is 4× the normal speed, every $4^{th}$ frame is displayed. In other embodiments, once the subtitle is selected, the displayed digital content is selected based on their relevance to the subtitles. In yet another embodiment, subtitles are tagged with a rating such that higher rated subtitles are displayed.

Upon receiving a command to fast-forward through digital content, the method determines a fast forward speed. The fast-forward speed may be, for example, two times (2×), four times (4×), or eight times (8×) the normal speed. The method determines what frames are shown and extracts subtitles corresponding to the frames based on time information. As the fast-forwarding continues, a next nearest subtitle associated with a current frame is extracted and displayed.

Advantageously, the present invention may be provided as a plug-in to provide a method to intelligently display subtitles during a change in speed of digital content. Users of media players, such as ADOBE® Media Player, WINDOWS® media player or any player of digital content receive a more enjoyable user experience where they can view subtitles during a change in speed.

Various embodiments of a method and apparatus for subtitle resynchronization and display are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. As used herein, "change in speed" refers to both fast-forward or reverse, where fast-forward represents a positive change in speed and reverse represents a negative change in speed.

FIG. 1 is a block diagram of an apparatus 100 for subtitle display, according to one or more embodiments. The apparatus 100 includes a computer 102. The computer 102 is a type of computing device (e.g., a laptop, a desktop, a Personal Digital Assistant (PDA) and/or the like) capable of playing digital content 114. The computer 102 includes a Central Processing Unit (CPU) 104, support circuits 106, a display 108, and a memory 110. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 110 includes at least one of Read Only Memory (ROM), Random Access Memory (RAM), disk drive storage, optical storage, removable storage and/or the like. It is noted that display 108 may be positioned separate from computer 102. For example, in one embodiment, computer 102 may comprise a cable television box which supplies a multi-media signal to a display 108 comprising a television.

The memory 110 includes an operating system 112, digital content 114, a subtitle resynchronization module 118, and a content display module 120. The digital content 114 includes a plurality of frames 115 and subtitles 116. The subtitles 116 may be stored as metadata. The subtitles 116 are associated with particular frames 115 of the digital content 114, but are not necessarily part of the digital content 114. The operating system 112 may include various commercially known operating systems. The digital content 114 may refer to any electronic data that may be consumed on a media player, such as readable text, data associated with graphics, data associated with images, data associated with video, data associated with audio, and the like.

In one embodiment, upon receiving a command to fast-forward the digital content 114, the subtitle resynchronization module 118 determines the fast-forward rate. The content display module 120 then presents the digital content 114 to display 108 based on the fast-forwarding speed. For example, if the fast-forwarding speed is 8× the normal speed, and there are 30 frames through which to fast-forward, the content display module 120 will present for display every $8^{th}$ frame 115 of the digital content 114, namely frames 1, 9, 17, and 25. Based on the fast forward rate, the subtitle resynchronization module extracts subtitles 116 based on the associated portion of the digital content 114 currently being presented for display. The subtitle resynchronization module 118 determines the time information for the digital content 114 currently being presented for display and selects the next nearest subtitle. The subtitle resynchronization module 118 also determines the duration of time that the next nearest subtitle 116 would have been displayed at normal speed. For example, if the subtitle resynchronization module 118 receives the command to fast-forward at time 00:22, and the next nearest subtitle 116 is at time 00:24 and is displayed until time 00:27, the subtitle resynchronization module 118 extracts the subtitle 116 from time 00:24. The subtitle resynchronization module 118 presents for display (on display 108), at time 00:22, the extracted subtitle 116 for a duration of six (6) seconds because at normal speed, the subtitle 116 would have displayed for six (6) seconds. After the six seconds are over (and if a command to stop fast-forwarding has not yet been received), the subtitle resynchronization module 118 determines the next nearest subtitle 116 from the current location of the digital content 114 and presents for display the extracted subtitle 116 for its normal duration. In this manner, not all subtitles 116 associated with the digital content 114 are displayed, but the subtitles 116 that have been extracted are displayed for their normal duration thereby actively providing a user a better understanding of the current location within the digital content 114 during a speed change operation.

In another embodiment, the subtitle resynchronization module 118 performs subtitle resynchronization as described above, however, the content display module 120 presents for display more relevant frames 115 of the digital content 114. The content display module 120 identifies what subtitle 116 the subtitle resynchronization module 118 has extracted for display. The content display module 120 then presents for display the frames 115 of the digital content 114 that are associated with the subtitle 116. For example, if a user fast-forwards through 30 frames at 8× the normal speed, and the subtitle is associated with the first six seconds of the digital content 114, the content display module 120 may present for display frames 1, 3, 5, and 7, (of frames 1-30, instead of frames 1, 9, 17, and 25) as they are the frames associated with the extracted subtitle 116, thereby providing a user a better understanding of the context of the subtitle 116.

In yet another embodiment, the content display module 120 presents for display the digital content 114 at the selected fast-forwarding speed, and all associated subtitles 116 are displayed for their normal duration, which may result in a display of more than one subtitle 116 at a given time. For example, if a user fast-forwards through 30 frames at 8× the normal speed, and a first subtitle 116 may be associated with the first six seconds of the digital content 114, and a second subtitle 116 may be associated with third through eighth seconds of digital content 114. The content display module 120 may display the first subtitle 116 when fast forwarding is selected and present it for display for six seconds. At the three second point, the content display module 120, which is already presenting for display the first subtitle 116, displays the second subtitle 116 in addition to the first subtitle 116. The first subtitle 116 is removed from the display after six seconds while the second subtitle 116 continues to be presented for display for an additional two seconds (until its normal display time has expired). In this embodiment, more than one subtitle is presented at a given time for display during the fast-forwarding operation.

In yet another embodiment, the subtitles 116 are ranked by importance or relevance. When a selection is required for which subtitle 116 to extract, the subtitle resynchronization module 118 may select a higher ranked subtitle 116 instead of a next nearest subtitle for display. For example, when multiple subtitles 116 are presented for display, there may be room on the display for only two subtitles 116. If a third subtitle 116 is to be presented for display, the lowest ranked subtitle is removed from display in order to make room for a higher ranked subtitle.

In yet another embodiment where the subtitles 116 are ranked by importance or relevance, the digital content to be displayed at the selected fast-forwarding speed can be that content which is associated with the relevant subtitle. For example, if a user fast-forwards through 30 frames at 8× the normal speed, and the highest ranked subtitle 116 is associated with the second six seconds of the digital content 114, the content display module 120 may present for display frames 9, 11, 13, and 15 (of frames 1-30, instead of frames 1, 9, 17, and 25) as they are the frames associated with the highest ranked subtitle 116.

Figure 2:
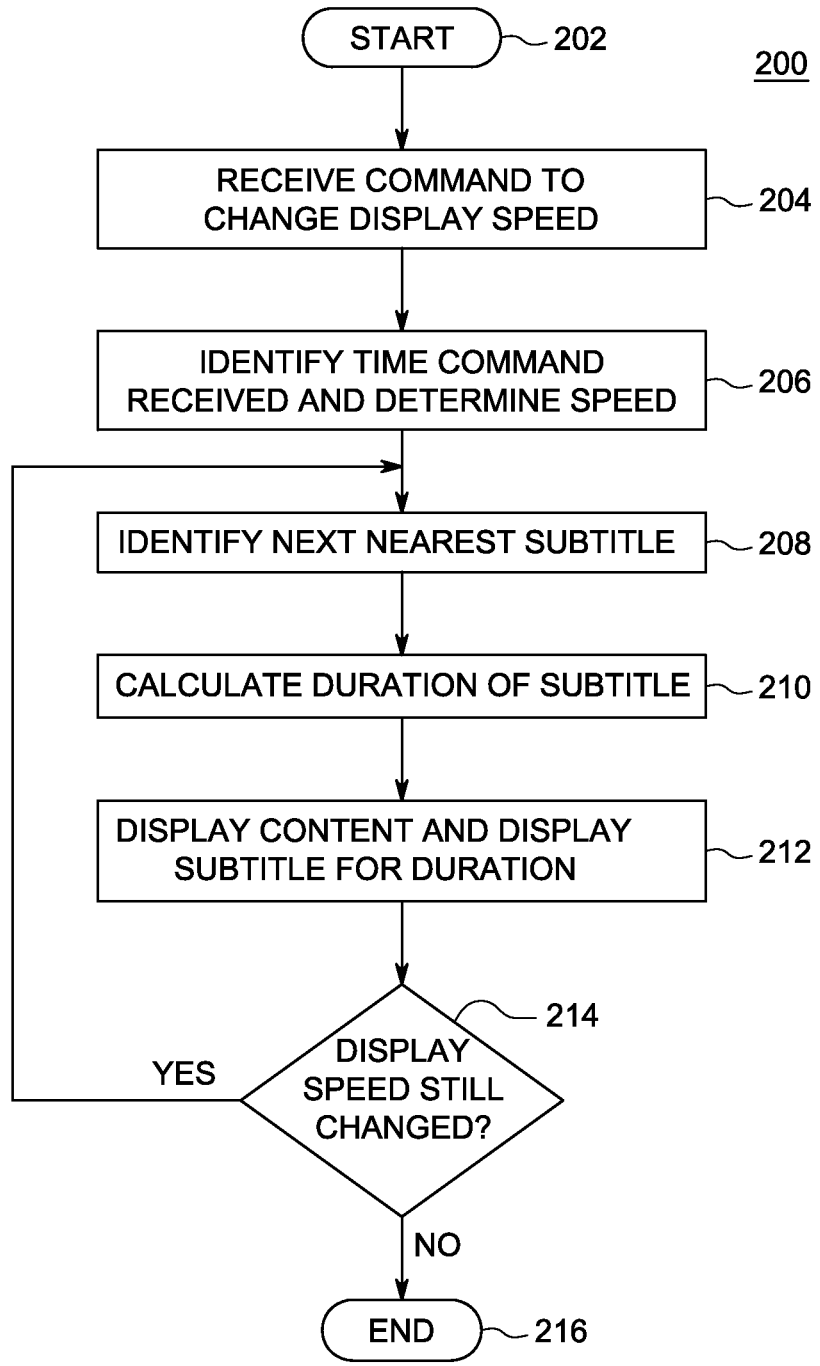
FIG. 2 depicts a flow diagram of a method for subtitle display as performed by the subtitle resynchronization module of FIG. 1, according to one or more embodiments.

FIG. 2 depicts a flow diagram of a method 200 for subtitle display as performed by the subtitle resynchronization module 118 of FIG. 1, according to one or more embodiments. The method 200 extracts subtitles associated with digital content and presents them for display for a duration of time commensurate with the amount of time the subtitle is displayed when the digital content is played at a normal speed. When that duration of time expires, a next nearest subtitle to the current frame is presented for display for a duration of time commensurate with the amount of time the subtitle is displayed when the digital content is played at a normal speed.

The method 200 starts at step 202 and proceeds to step 204. At step 204, the method 200 receives a command to change the display speed of the digital content. The exemplary embodiments discuss the change of display speed of the digital content as fast-forwarding, however, the method 200 may also be applied to reversing the digital content. The command may be received in response to a user input. The user input may be through a user-interface on a computer or via a remote control or any other mechanism for sending a fast-forwarding command. The method 200 proceeds to step 206, where the method 200 identifies the time within the digital content when the command was received and determines a selected speed at which the digital content is to be fast-forwarded. Each frame of the digital content is associated with time, for example, digital content begins at time 00:00:00, meaning 0 hours, 0 minutes, 0 seconds. The digital content is played at a normal rate, where the normal rate is pre-defined, for example, at 60 frames per second (fps). The fast-forward speed may be, for example, two times (2×), four times (4×), eight times (8×) the normal speed, or any other speed at which the digital content may be played.

The method 200 proceeds to step 208, where the method 200 identifies the next nearest subtitle associated with the portion of the digital content that is being fast-forwarded. The subtitles may be included in the metadata of the digital content and may be part of the digital content or may be separate from the digital content. The subtitles are also associated with time. For example, a subtitle may be displayed from time 00:00:22 until time 00:00:27. During playback of the digital content at normal speed, the subtitle is displayed with the digital content for six seconds beginning at time 00:00:22.

When in fast-forwarding mode, the method 200 looks at the current time, for example, the digital content may be at time 00:00:20, which means the fast forwarding command was received 20 seconds from the start of the digital content. The method 200 looks at the subtitles at time 00:00:20. If there is a subtitle that is displayed at this time, the method 200 identifies this subtitle as the next nearest subtitle. However, if there is no subtitle at the current time, the method 200 identifies the next nearest time where a subtitle is associated with the digital content that is to be presented. In the current example, a subtitle is associated with time 00:00:22 through time 00:00:27, which is the next nearest subtitle from the current time of 00:00:20 when in the fast-forwarding mode.

The method 200 proceeds to step 210, where the method 200 calculates the duration of the identified next nearest subtitle. The method 200 calculates the duration that the subtitle is displayed at normal speed. In the current example, the subtitle is associated with time 00:00:22 through time 00:00:27, which is 6 seconds.

The method 200 proceeds to step 212, where the method 200 presents for display the digital content and the identified next nearest subtitle. Regardless of the speed at which fast-forward is selected, the method 200 displays the subtitle for the same time duration at the fast-forward speed as it would have been displayed at normal speed. When the duration expires, the method 200 removes the subtitle from the display. In this example, the subtitle is displayed for 6 seconds. In some embodiments, the method 200 displays the digital content simply based on the fast-forwarding speed. For example, if the fast-forwarding speed is 8× normal speed, the method 200 displays every $8^{th}$ frame of the digital content during fast-forwarding. If the speed is 4× normal speed, the method 200 displays every $4^{th}$ frame of the digital content during fast-forwarding. Hence, during fast-forwarding, the subtitles are no longer associated with the digital content with which it was associated at normal speed. Instead, a new association is created wherein the subtitles are associated with a different set of digital content that is being displayed at the fast-forward speed.

In other embodiments, the method 200 biases the frame/subtitle association so as to present for display the frames associated with the identified next nearest subtitle in a manner so as to retain relevancy between the displayed digital content and the displayed subtitles. For example, if the identified next nearest subtitle is associated with frames 10 through 20 of the digital content, but frames 10 through 30 are being fast-forwarded, the method 200 biases the resynchronization so that instead of displaying every $8^{th}$ frame (i.e., 10, 18, 26, 34), displays the frames associated with the displayed subtitle. In this example, the method 200 may display frames 10, 12, 14, and 16 in order to provide a better understanding of the context of the subtitles.

The method 200 proceeds to step 214, where the method 200 determines whether the digital content is still being fast-forwarded. If the method 200 determines that the digital content is still being fast-forwarded, the method 200 determines the current time of the digital content and proceeds to step 208, where the method 200 iterates until fast-forwarding is stopped by a user (or the end of the digital content is reached), at which time the method 200 proceeds to step 216 and ends.

Figure 3:
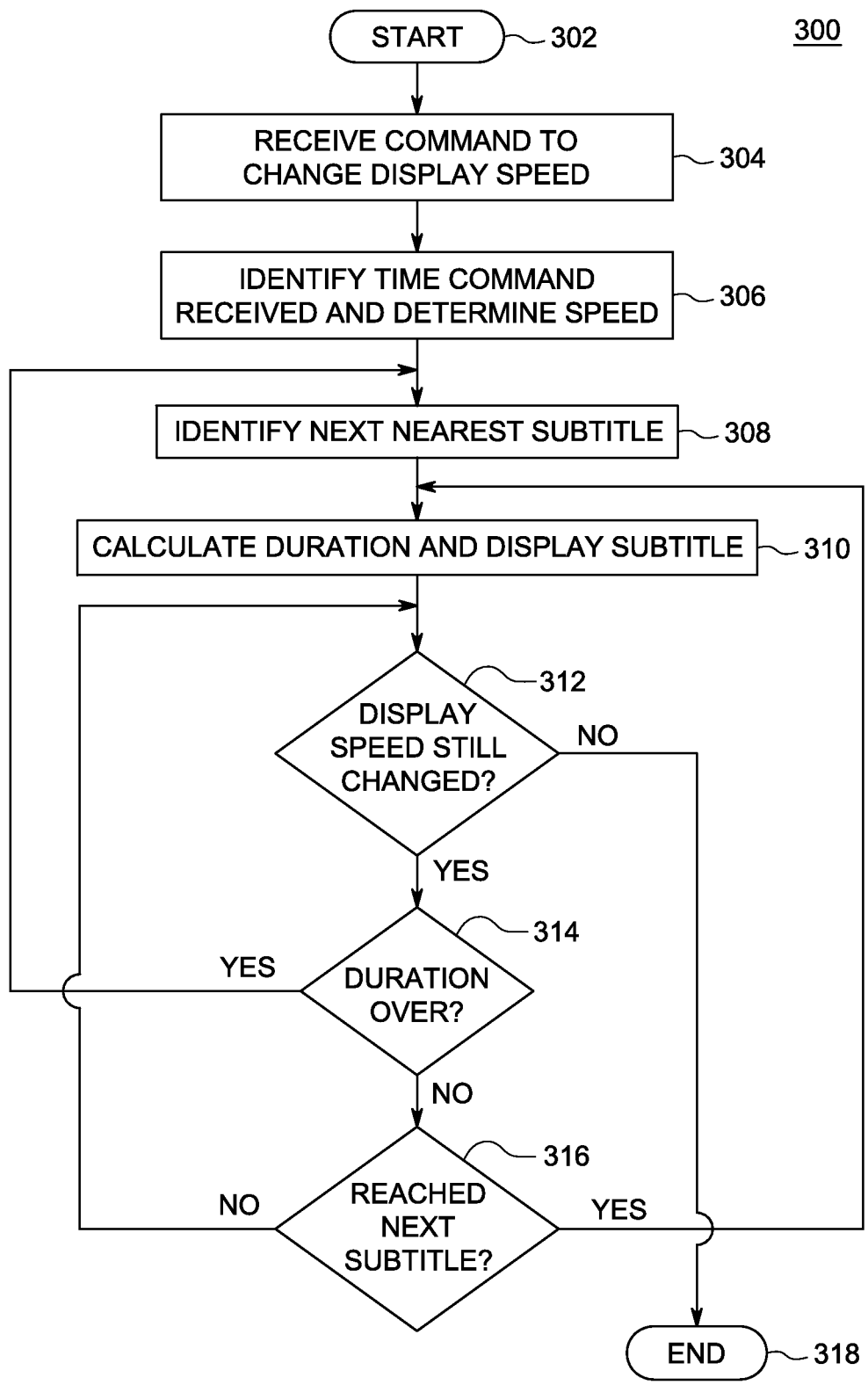
FIG. 3 depicts a method for displaying multiple subtitles as performed by the subtitle resynchronization module of FIG. 1, according to one or more embodiments.

FIG. 3 depicts a method 300 for displaying multiple subtitles as performed by the subtitle resynchronization module 118 of FIG. 1, according to one or more embodiments. The method 300 displays all subtitles by enabling display of multiple subtitles during fast-forwarding.

The method 300 starts at step 302 and proceeds to step 304, where the method 300 receives a command to fast-forward through digital content. The method 300 proceeds to step 306, where the method 300 identifies the time within the digital content when the command was received and determines a selected speed at which the digital content is to be fast-forwarded. The method 300 proceeds to step 308, where the method 300 identifies the next nearest subtitle. The method 300 proceeds to step 310, where the method 300 calculates the duration of the identified next nearest subtitle and displays both the subtitle and the digital content, as described above with respect to steps 204 through 210 of method 200 above.

The method 300 proceeds to step 312, where the method 300 determines whether the digital content is still being fast-forwarded. If the method 300 determines that the digital content is no longer being fast-forwarded, the method 300 proceeds to step 318 and ends. However, if the digital content is still fast-forwarding, the method 300 proceeds to step 314. At step 314, the method 300 determines whether the time duration for a displayed subtitle expires. If the duration for a subtitle expires, the method 300 removes the expired subtitle from the display and proceeds to step 308 where the next nearest subtitle is identified. However if at step 314, the method 300 determines that the time duration for a displayed subtitle has not expired, the method proceeds to step 316 and determines, if based on the current time of the digital content being fast-forwarded, if another subtitle is associated with the current time of the digital content. If another subtitle is associated with the current time of the digital content, the method 300 iterates through steps 310 and 316 to present for display the next subtitle below the currently displayed subtitle.

A subtitle is displayed for the duration commensurate with the display time during normal speed. Subsequent subtitles are also displayed when the digital content with which the subtitle is associated is fast-forwarded. If, during the iteration, at step 314 it is determined that the subtitle's duration has expired, the subtitle is removed from the display and the result is effectively scrolling of the subtitles on the display as they appear in the fast-forwarded digital content. If, during the iteration, at step 312 it is determined that the command to fast-forward has ended, the method 300 proceeds to step 318 and ends.

In some embodiments, the subtitles are ranked according to their relevance or importance to the digital content. In such an embodiment, if there is not enough space to simultaneously display all of the subtitles on the screen, the method 300 selects the higher ranked subtitles to display. When a fast-forwarding command is stopped by a user or because the end of the digital content has been reached, the method 300 proceeds to step 318 and ends.

FIGS. 4A-4C depict an illustration 400 of displaying subtitles during fast-forwarding as performed by the subtitle resynchronization module 118 of FIG. 1, according to one or more embodiments.

FIG. 4A depicts a timeline 402. In the timeline, subtitle S1 406 is associated with frames that are displayed for the six seconds beginning at time 00:00:22 and ending at time 00:00:27. Subtitle S2 408 is associated with frames that are displayed for the four seconds beginning at time 00:00:40 and ending at time 00:00:43. Subtitle S3 410 is associated with frames that are displayed for the seven seconds beginning at time 00:00:58 and ending at time 00:00:64. For this example, the time 404 that the fast-forward command is received is 00:00:20.

FIG. 4B depicts the timeline 402. The time 404 that the fast-forward command is received is 00:00:20. Based on the time information in FIG. 4A, beginning at the start time 404 of 00:00:20, the next nearest subtitle is S1 406, which is associated with the time 00:00:22. The duration of S1 is six seconds. Therefore, starting at the start time 404, and for a duration 412 of six seconds, S1 is displayed. If the fast forward speed is 4× normal speed, in six seconds, 24 seconds of digital content is passed. Therefore, at time 00:00:27, the digital content that is displayed is the digital content at time 00:00:51 (normal speed). Referring back to FIG. 4A, the next nearest subtitle to time 00:00:51 is S3 at time 00:00:58. S3 has a duration of seven seconds. Therefore during fast-forwarding, for the duration 414 of seven seconds from time 00:00:27 through time 00:00:34, S3 is displayed. As a result, not all of the subtitles were displayed. Specifically, S2 was not displayed during fast-forwarding, but subtitles S1 and S3 were displayed for a duration commensurate with their display at normal speed.

FIG. 4C depicts the timeline 402 where more than one subtitle may be displayed at a given time. At the start time 404, the next nearest subtitle, S1 is displayed as described with respect to FIG. 4B. However, if the digital content is fast-forwarded at 8× normal speed, then after three seconds, subtitle S2 that is associated with digital content from time 00:00:40 through time 00:00:43 is displayed for its normal duration of four seconds. Therefore, for the duration 416 from time 00:00:20 through time 00:00:23, S1 is displayed. For the duration 418 from time 00:00:23 through time 00:00:26, S1 and S2 are simultaneously displayed. Because S1 is only displayed for six seconds, at time 00:00:26, S1 is removed from the display and S2 is the only subtitled displayed during duration 420 until time 00:00:27, when S2 is removed from the display because its four seconds have expired.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
receiving a command to change a first display speed of digital content, wherein the digital content comprises a sequence of a plurality of frames and a plurality of subtitles;
identifying at least one subtitle associated with a frame of the digital content at the first display speed;
determining a pre-defined length of display time for the at least one subtitle based on an association with the digital content at the first display speed;
presenting for display frames of the digital content at a second display speed that is different than the first display speed;
calculating a new subtitle display time based on the pre-defined length of time wherein a ratio between the new subtitle display time and the pre-defined length of display time is different than a ratio between the second display speed and the first display speed; and
presenting for display the at least one subtitle for the new subtitle display time, in connection with frames of digital content being displayed at the second display speed.

2. The method of claim 1, wherein presenting for display the at least one subtitle comprises displaying a number of subtitles that are fewer than all of the subtitles associated with the digital content at the first display speed, and
wherein the new subtitle display time is equal to the pre-defined length of time.

3. The method of claim 1, further comprising:
identifying a ranking between a first subtitle and a second subtitle, wherein the first subtitle precedes the second subtitle in the sequence of the plurality of frames and the plurality of subtitles; and
presenting the second subtitle for display in place of the first subtitle based on the ranking.

4. The method of claim 1, further comprising:
identifying frames of the digital content that are relevant to the at least one subtitle; and
wherein presenting for display frames of the digital content at the second display speed comprises presenting frames of the digital content that are relevant to the at least one subtitle such that a ratio between frames relevant to the at least one subtitle displayed at the second display speed and frames relevant to the at least one subtitle displayed at the first display speed is greater than a ratio between the first display speed and the second display speed.

5. The method of claim 1, wherein the ratio between the new subtitle display time and the pre-defined length of display time is less than the ratio between the second display speed and the first display speed.

6. The method of claim 1, wherein identifying the at least one subtitle comprises:
determining a current time in the digital content that is presented for display; and
determining a next nearest subtitle to the current time.

7. The method of claim 1, wherein the pre-defined length of time is an amount of time the at least one subtitle is displayed when the digital content is played at a normal speed.

8. A computer-implemented method for subtitle resynchronization and display comprising:
determining a second display speed in response to a command to change a first display speed of digital content, wherein the digital content comprises a sequence of a plurality of frames and a plurality of subtitles, and wherein the plurality of subtitles are displayed for a pre-defined length of time determined by an association with the digital content at the first display speed;

identifying at least one subtitle associated with an original set of frames of the digital content when played at the first display speed;

presenting for display frames of the digital content at the second display speed;

selecting a new association between the identified at least one subtitle, at least one frame from the original set of frames, and at least one additional frame not in the original set of frames; and presenting for display, for at least the pre-defined length of time, the at least one subtitle in the new association with the at least one frame from the original set of frames and the at least one additional frame not in the original set of frames at the second display speed.

9. The method of claim 8, wherein presenting for display the at least one subtitle comprises displaying a number of subtitles that are fewer than all of the subtitles associated with the digital content at the first display speed.

10. The method of claim 8, further comprising:
identifying a ranking between a first subtitle and a second subtitle, wherein the first subtitle precedes the second subtitle in the sequence of the plurality of frames and the plurality of subtitles; and
presenting the second subtitle for display in place of the first subtitle based on the ranking.

11. The method of claim 8, further comprising:
identifying frames of the digital content that are relevant to the at least one subtitle; and
wherein presenting for display frames of the digital content at the second display speed comprises presenting frames of the digital content that are relevant to the at least one subtitle such that a ratio between frames relevant to the at least one subtitle displayed at the second display speed and frames relevant to the at least one subtitle displayed at the first display speed is greater than a ratio between the first display speed and the second display speed.

12. The method of claim 8, wherein the at least one subtitle is presented for display when the time of a frame on which the at least one subtitle begins is arrived at during display of the digital content at the second display speed.

13. The method of claim 8, wherein identifying the at least one subtitle comprises:
determining a current time in the digital content that is presented for display; and
determining a next nearest subtitle to the current time.

14. A non-transitory computer readable medium for storing computer instructions that, when executed by at least one processor causes the at least one processor to:
determine a second display speed in response to a command to change a first display speed of digital content, wherein the digital content comprises a sequence of a plurality of frames and a plurality of subtitles, and wherein the plurality of subtitles are displayed for a pre-defined length of time determined by an association with the digital content at the first display speed;
identify at least one subtitle associated with an original set of frames of the digital content at the first display speed;

present for display frames of the digital content at a second display speed;
select a new association between the identified at least one subtitle, the at least one frame from the original set of frames, and at least one additional frame not in the original set of frames;
calculate a new subtitle display time based on the pre-defined length of time wherein a ratio between the new subtitle display time and the pre-defined length of display time is less than a ratio between the second display speed and the first display speed; and
presenting for display, for the new subtitle display time, the at least one subtitle in the new association with the at least one frame from the original set of frames being displayed at the second display speed and the at least one additional frame not in the original set of frames being displayed at the second display speed.

15. The non-transitory computer readable medium of claim 14, wherein presenting for display the at least one subtitle comprises displaying a number of subtitles that are fewer than all of the subtitles associated with the digital content at the first display speed, and
wherein the new subtitle display time is equal to the pre-defined length of time.

16. The non-transitory computer readable medium of claim 14, further comprising instructions that, when executed by the at least one processor, cause the at least one processor to:
identify a ranking between a first subtitle and a second subtitle, wherein the first subtitle precedes the second subtitle in the sequence of the plurality of frames and the plurality of subtitles; and
present for display the second subtitle in place of the first subtitle based on the ranking.

17. The non-transitory computer readable medium of claim 14, further comprising instructions, that when executed by the at least one processor, cause the at least one processor to:
identify frames of the digital content that are relevant to the at least one subtitle; and
wherein presenting for display frames of the digital content at the second display speed comprises presenting frames of the digital content that are relevant to the at least one subtitle such that a ratio between frames relevant to the at least one subtitle displayed at the second display speed and frames relevant to the at least one subtitle displayed at the first display speed is greater than a ratio between the first display speed and the second display speed.

18. The non-transitory computer readable medium of claim 14, wherein the at least one subtitle is presented for display when the time of a frame on which the at least one subtitle begins is arrived at during display of the digital content at the second display speed.

19. The non-transitory computer readable medium of claim 14, wherein identifying the at least one subtitle comprises:
determining a current time in the digital content that is presented for display; and
determining a next nearest subtitle to the current time.

20. The non-transitory computer readable medium of claim 14, wherein the pre-defined length of time is an amount of time the at least one subtitle is displayed when the digital content is played at a normal speed.

* * * * *